United States Patent
Kuo (10) Patent No.: US 6,767,024 B1
(45) Date of Patent: Jul. 27, 2004

(54) FRONT SUSPENSION SYSTEM WITH LOCK DEVICE

(76) Inventor: Yung-Pin Kuo, No. 55, Alley 121, Lane 175, Kuo Shen Rd., Chang Hwa City (TW)

( * ) Notice: Subject to any disclaimer, the term of this patent is extended or adjusted under 35 U.S.C. 154(b) by 0 days.

(21) Appl. No.: 10/623,700

(22) Filed: Jul. 22, 2003

(51) Int. Cl.[7] ............................................. B62K 21/00
(52) U.S. Cl. ...................... 280/276; 280/275; 74/500.5; 74/502.2; 188/285
(58) Field of Search ................................ 280/276, 275, 280/283, 284; 74/500.5, 501.6, 502.2, 519; 188/281, 272, 282.4, 285, 300

(56) References Cited

U.S. PATENT DOCUMENTS

| | | | | |
|---|---|---|---|---|
| 4,679,811 A | * | 7/1987 | Shuler | 280/284 |
| 5,275,264 A | * | 1/1994 | Isella | 188/299.1 |
| 5,320,375 A | * | 6/1994 | Reeves et al. | 280/284 |
| 5,909,890 A | * | 6/1999 | Sachs et al. | 280/284 |
| 6,120,049 A | * | 9/2000 | Gonzalez et al. | 280/276 |
| 6,217,049 B1 | * | 4/2001 | Becker | 280/276 |
| 6,382,370 B1 | * | 5/2002 | Girvin | 188/299.1 |
| 6,631,915 B2 | * | 10/2003 | Barefoot | 280/276 |

* cited by examiner

*Primary Examiner*—Daniel G. DePumpo
(74) *Attorney, Agent, or Firm*—Rosenberg, Klein & Lee (57) ABSTRACT

A bicycle front suspension system includes two cylinders on the front fork and each cylinder includes an outer tube and an inner tube which is movably received in the outer tube. A cap is rotatably connected to the inner tube and connected to a rod. A control cable is connected between the cap and a lever which is rotatably engaged in a collar on the handlebar of the bicycle. The lever is rotated to operate the control cable so as to rotate the cap and the rod. The rotation of the rod controls the communication between two chambers in the inner tube so that the hydraulic fluid is controlled to make the cylinder to be locked or operative.

6 Claims, 11 Drawing Sheets

FRONT SUSPENSION SYSTEM WITH LOCK DEVICE

FIELD OF THE INVENTION

The present invention relates to a bicycle front suspension system which is controlled by a controller on the handlebar so as to limit the hydraulic fluid from flowing in communication between two chambers in the suspension system.

BACKGROUND OF THE INVENTION

A conventional bicycle front suspension device generally includes two cylinders on the front fork and each contains hydraulic fluid which flows between two chambers so as to let the inner portion be movable relative to the outer portion when a load is applied to the bicycle. The front suspension device is a popular device and provides the cyclists a comfortable riding condition regardless of the condition of roads. Nevertheless, this suspension device becomes a burden when the bicycle goes on an upward slope. Responsive to this, U.S. Pat. No. 6,217,049 discloses a lockout mechanism which allows the cyclists to lock the suspension device when the bicycle goes upward. However, the lockout mechanism is not convenient for the cyclist to operate because the adjusting pin is located at the position where the cyclist has to get off the saddle so as to access the adjusting pin.

The present invention intends to provide a bicycle front suspension device that has a controller on the handlebar so that the cyclist simply shifts a lever to lock or unlock the front suspension device.

SUMMARY OF THE INVENTION

In accordance with one aspect of the present invention, there is provided a controller and a bicycle front suspension device. The controller comprises a first collar and a slot is defined radially through the first collar. A second collar is rotatably engaged in the first collar and a lever extends radially from the second collar. The lever extends through the slot and an engaging member is located on the second collar and beside the lever. A stop device is connected to the first collar and located cross over the slot.

A control cable has an end fixed to the second collar and the other end of the control cable is fixed to a cap of one of two suspension cylinders of the front suspension system. The cap is rotated between an operative position for allowing the suspension cylinder to absorb shock, and a lockout position for allowing the suspension cylinder to be locked.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
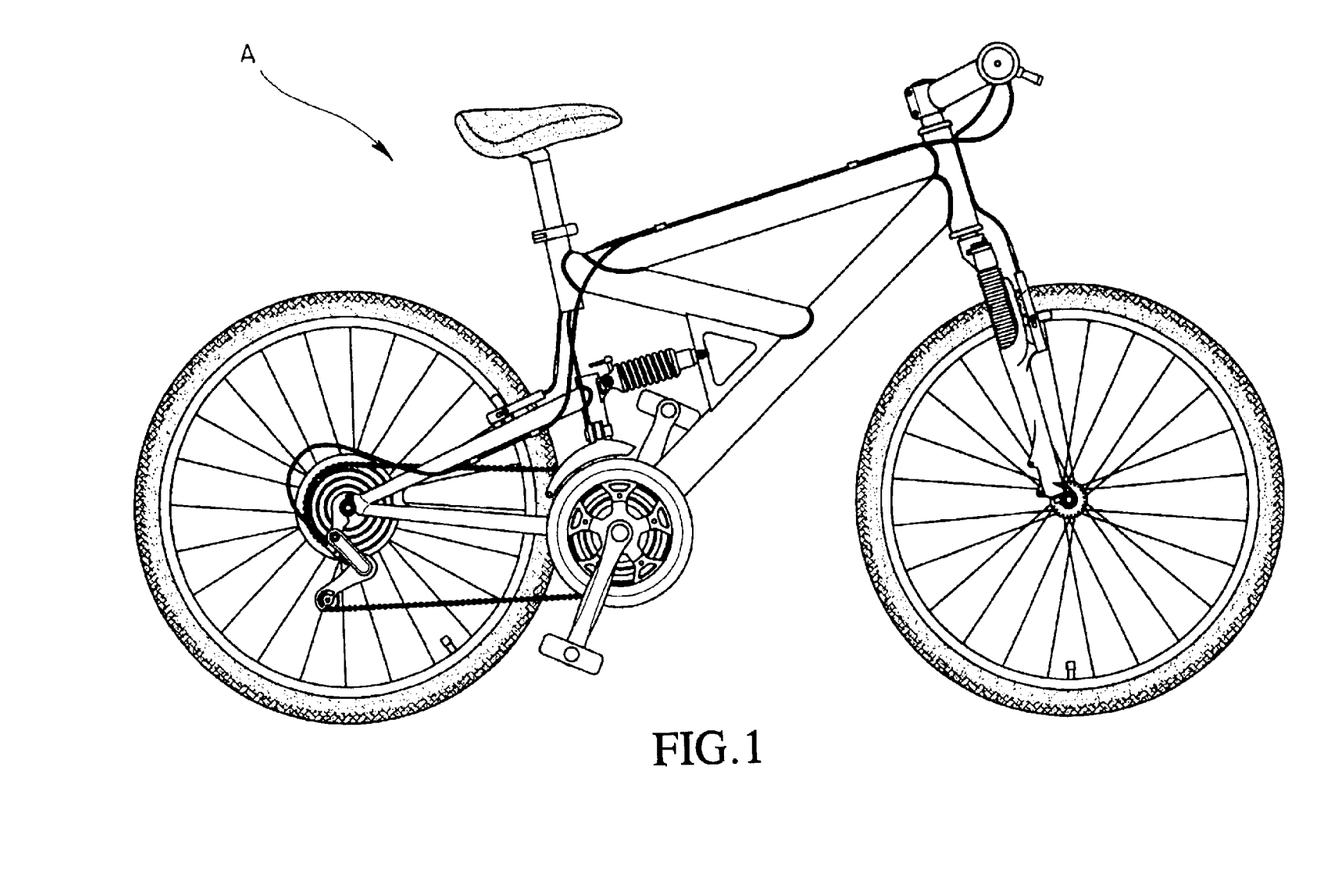
FIG. 1 is a side view to show the front suspension system on a bicycle.
Figure 2:
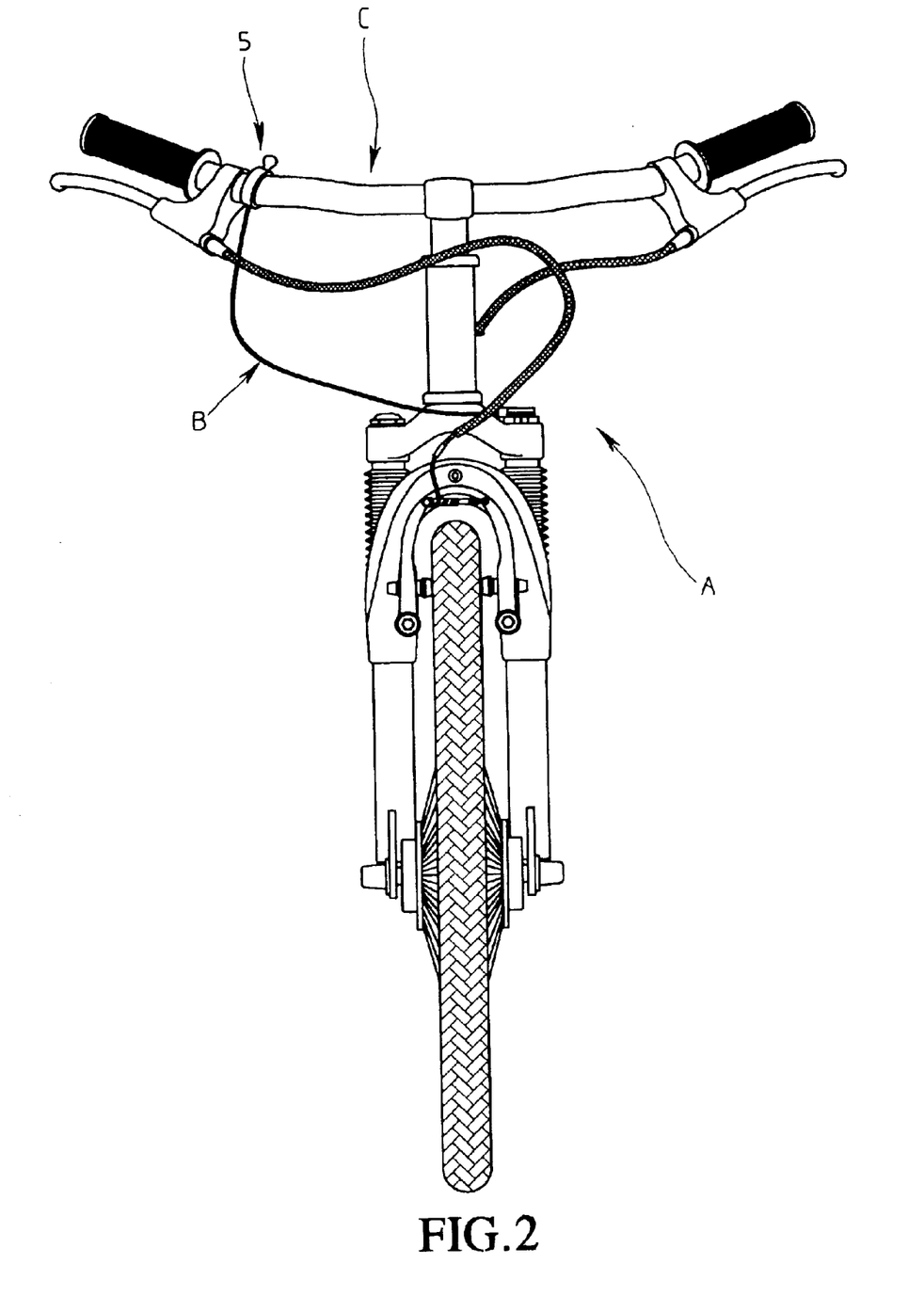
FIG. 2 is a front view to show the control cable is connected between the controller and the front suspension system.
Figure 3:
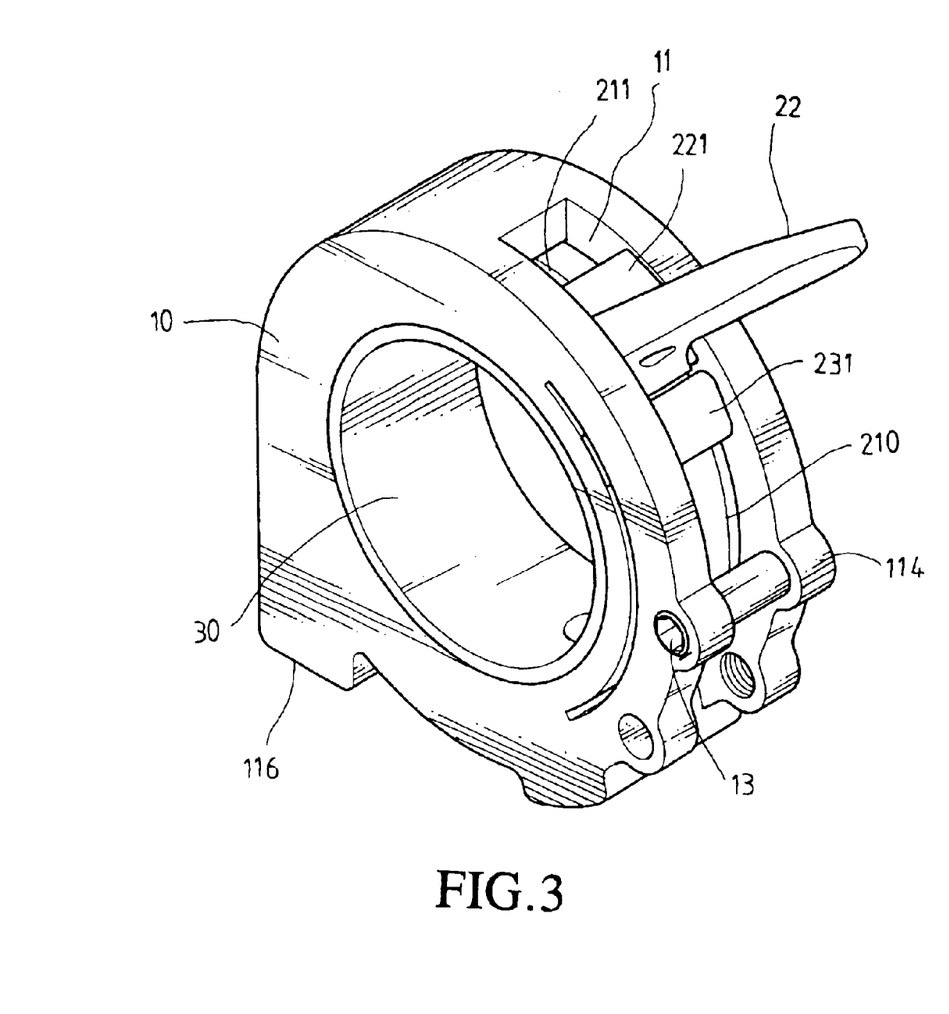
FIG. 3 is a perspective view to show the two collars of the controller of the present invention.

Referring to FIGS. 1 and 2, the controller 5 as shown in FIG. 3 is connected to the handlebar "C" of the bicycle "A" and a control cable "B" is connected between the controller 5 and one of two cylinders of the front suspension fork of the present invention.

Figure 3A:
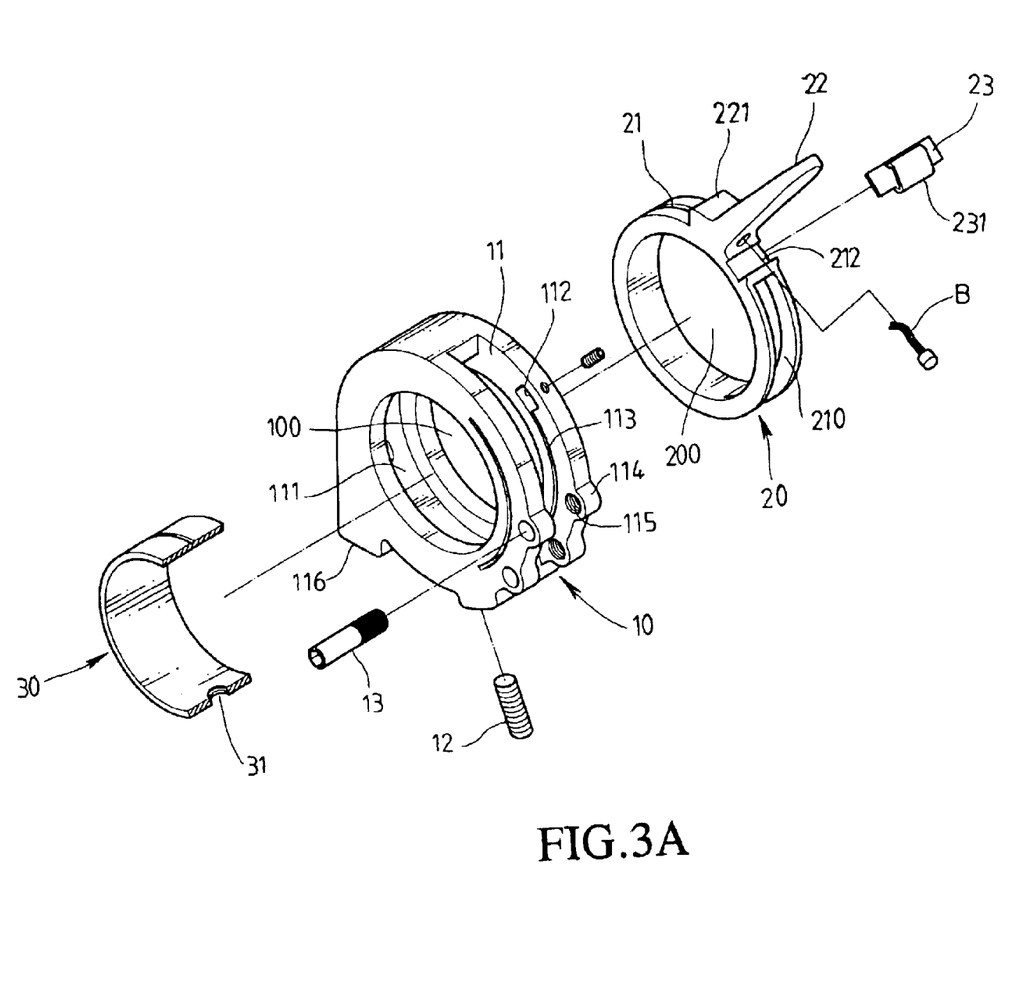
FIG. 3A is an exploded view to show the two collars of the controller of the present invention.
Figure 4:
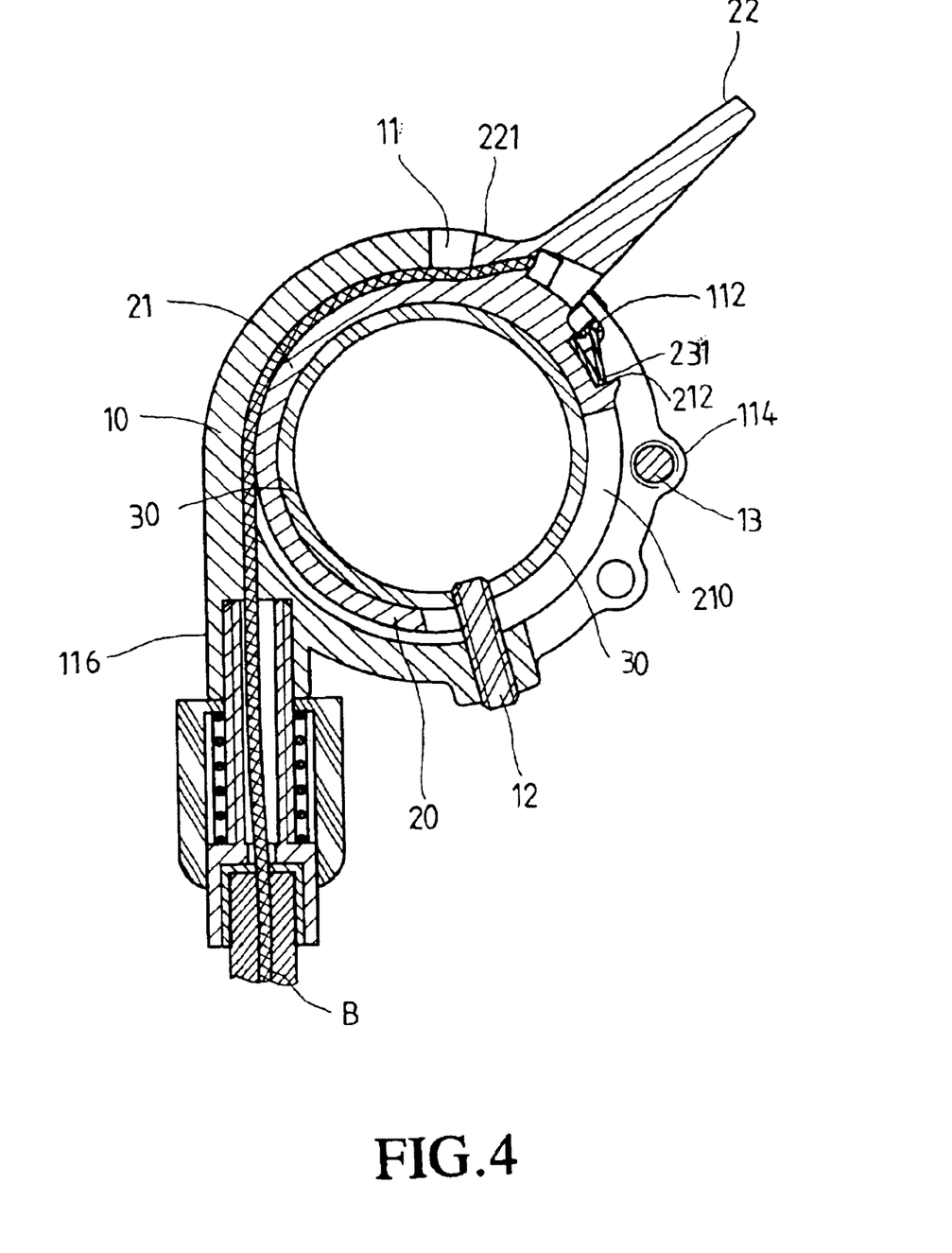
FIG. 4 is a cross sectional view to show the lever is located at the operative position.

Referring to FIGS. 3, 3A and 4, the controller 5 comprises a first collar 10 having a though hole 100 and a second collar 20. A slot 11 is defined radially through the first collar 10 and two lugs 114 extend from the outside of the first collar 10. The slot 11 is located between the two lugs 114. A stop device 13 such a pin which extends through two lugs 114 on the first collar 10. The stop device 13 is located cross over the slot 11. Each of two facing insides of the slot 11 has a recess 112 defined therein and a groove 113 is in communication with the respective one of the recesses 112. A positioning groove 111 is defined in an inner periphery of the first collar 10.

Figure 5:
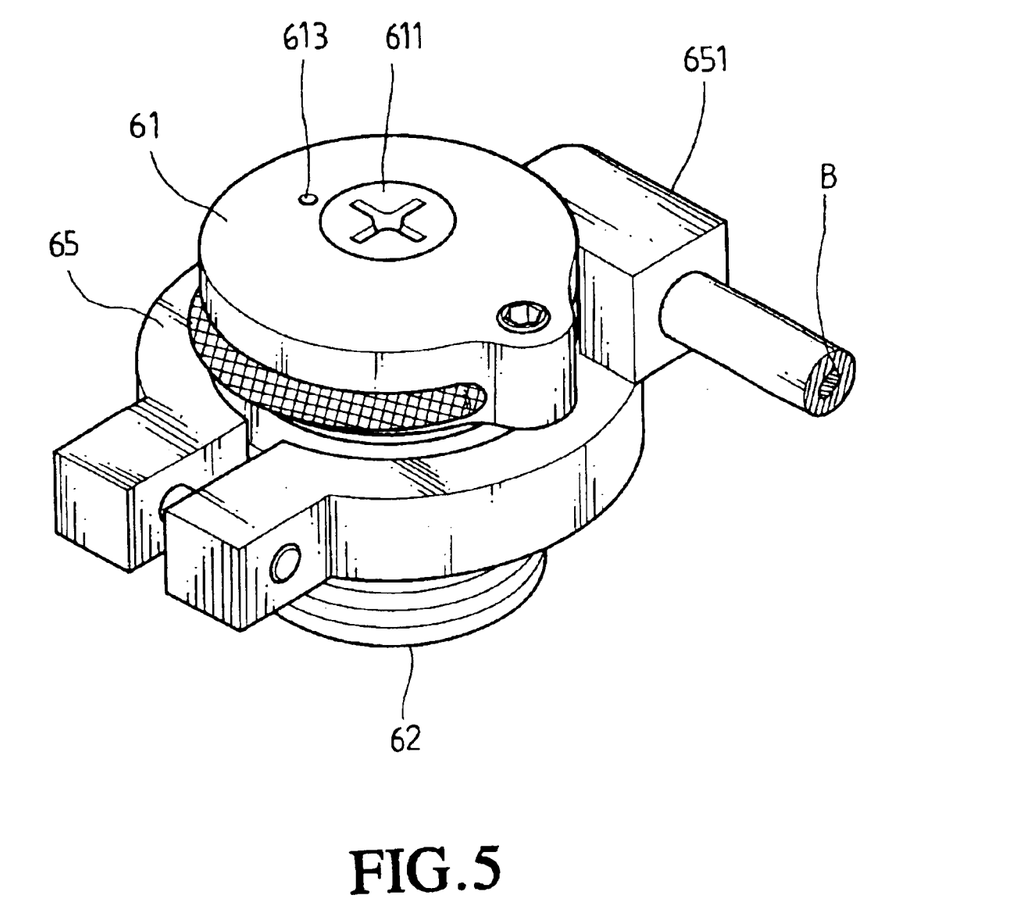
FIG. 5 is a perspective view to show the cap and the base member and the control cable is wrapped to the cap.
Figure 6:
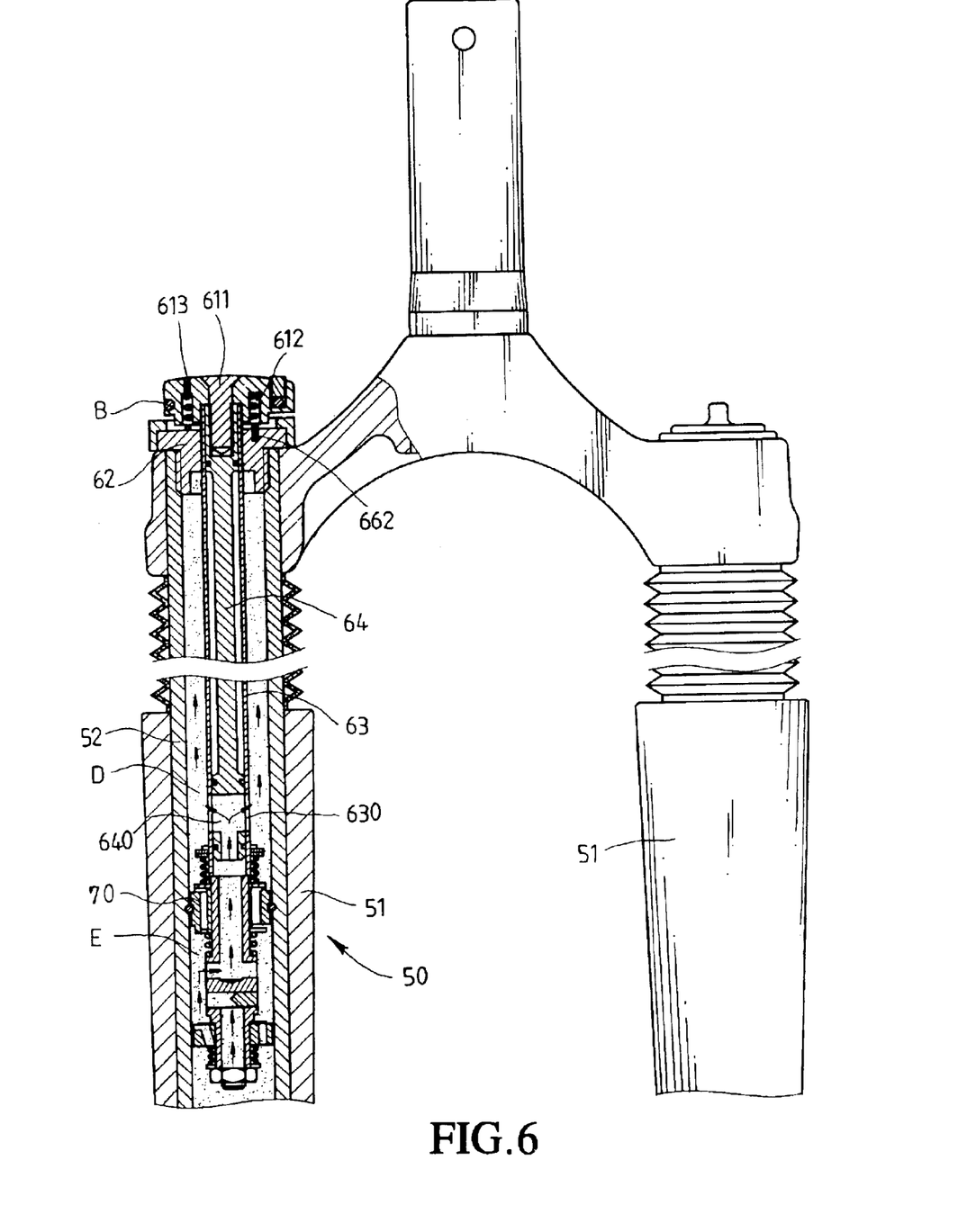
FIG. 6 shows the front suspension fork and one of the two cylinders is shown in cross section.

A second collar 20 is rotatably engaged in the through hole 100 via the slot 11 and a lever 22 extends radially from the second collar 20. The lever 22 extends through the slot 11 and an engaging member 23 is located on the second collar 20 and beside the lever 22. A slot 210 is defined through the second collar 20 and a positioning screw 12 radially extends through the first collar 10, the slot 210 in the second collar 20 and a hole 31 in a soft ring 30 which is engaged with the through hole 200 so as to contact the handlebar "C" that extends through the through hole 200 of the second collar 20 to position the controller 5 on the handlebar "C". An positioning groove 21 is defined in an outer periphery of the second collar 20 so that an end of the control cable "B" extends from the end 116 of the first collar 10 and is engaged with the positioning grooves 111 and 21. The end of the control cable "B" is fixed to a root portion 221 of the lever 22. As shown in FIGS. 5 and 6, the other end of the control cable "B" is fixedly to a cap 61 of one of two suspension cylinders 50 of the front suspension system.

The engaging member 23 has two wings which are movably inserted in the recesses 12 and sized to be slid in the grooves 113. A spring plate 231 extends at angle from the engaging member 23.

Figure 6A:
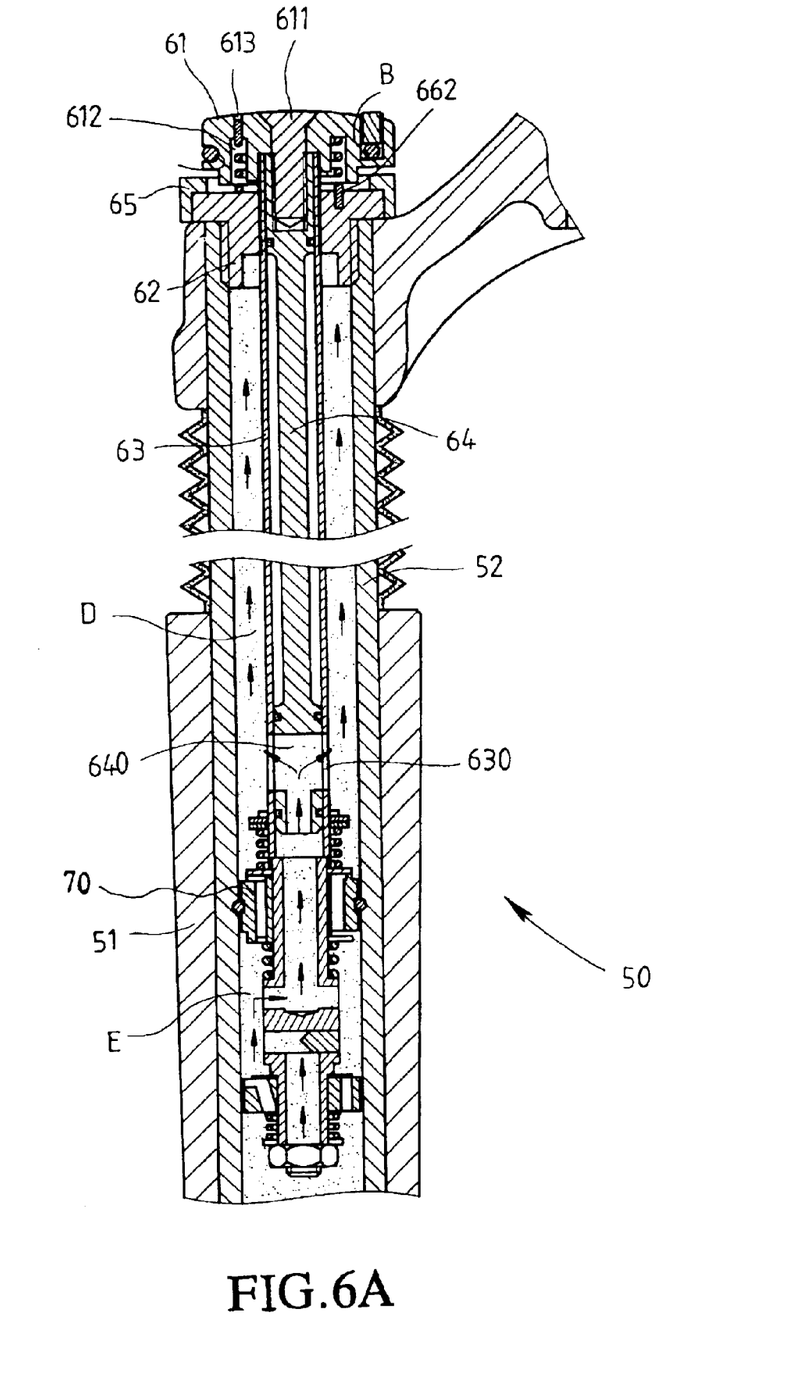
FIG. 6A is a cross sectional view to show the cylinder is in operative condition.

Referring to FIGS. 5, 6 and 6A, each of the cylinders 50 of the front suspension system includes an outer tube 51 which is connected to the hub of the front wheel of the bicycle and an inner tube 52 which is movably inserted in the outer tube 51. The cap 61 is connected to a base member 62 which is threadedly connected to a top of the inner tube 52. A positioning bolt 611 extends through a center of the cap 61 and is fixed to the base member 62 so that the cap 61 is rotatable about the positioning bolt 611. A clamp ring 65 is securely mounted to the base member 62 and the control cable "B" extends into a block 651 on the clamp ring 65 and wraps the periphery of the cap 61, such that when the control cable "B" is pulled, the cap 61 is rotated.

A rod 64 is connected to an underside of the cap 61 and inserted in a tube 63 which is located in the inner tube 52. A separation member 70 is connected to a lower end of the tube 63 and divides an inner space of the inner tube 51 into a first chamber "D" and a second chamber "E". The separation member 70 has an open distal end and a central passage. The tube 63 has first holes 630 defined through a wall thereof and the rod 64 has second holes 640 defined radially therethrough. The first chamber "D" is in communication with the second chamber "E" by aligning the second holes 640 with the first holes 630, such that the hydraulic fluid in the second chamber "E" can be pressed to enter the first chamber "D" when the outer tube 51 is moved relative to the inner tube 52. A torsion spring 612 is connected to the underside of the cap 61 and one end of the spring 612 is positioned by a pin 613 extending from a top of the cap 61, the other end of the spring 612 is positioned to the base member 62 by another pin 662 on the base member 62. The torsion spring 612 allows the cap 61 to be rotated when the lever 22 is rotated from the lockout position as shown in FIG. 4B to the operative position as shown in FIG. 4.

Figure 4A:
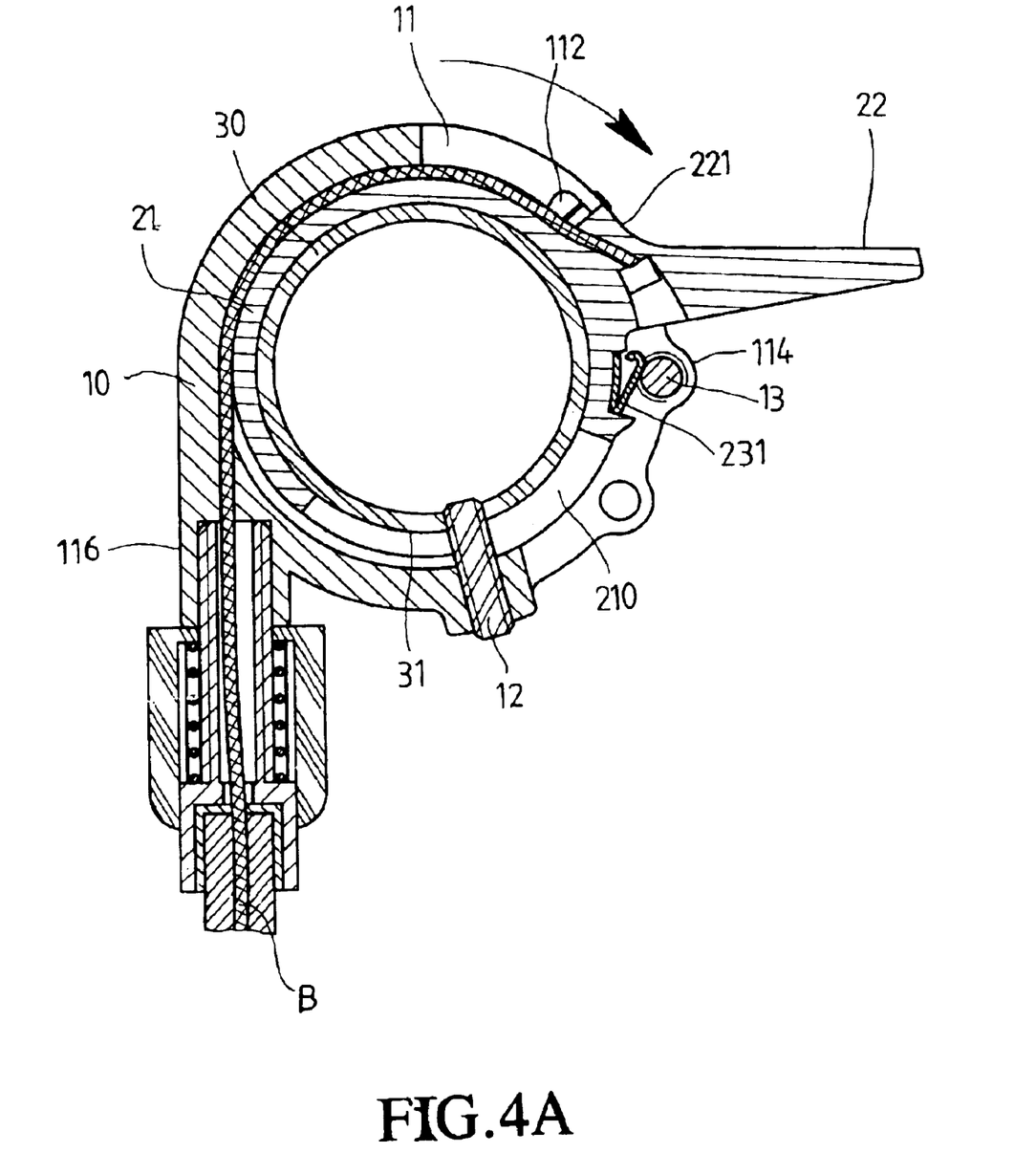
FIG. 4A is a cross sectional view to show that the lever is rotated.
Figure 4B:
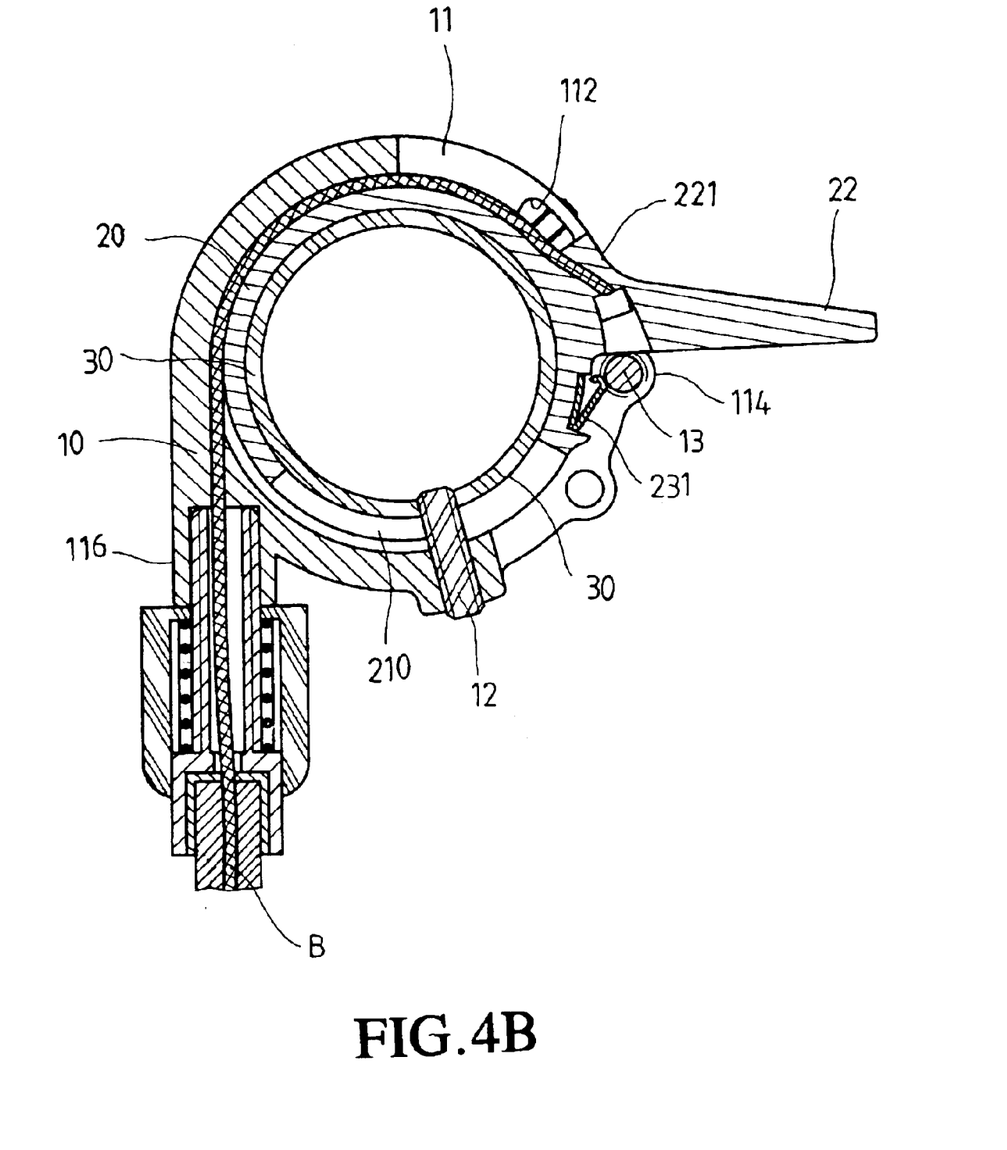
FIG. 4B is a cross sectional view to show that the lever is rotated to the lockout position.
Figure 6B:
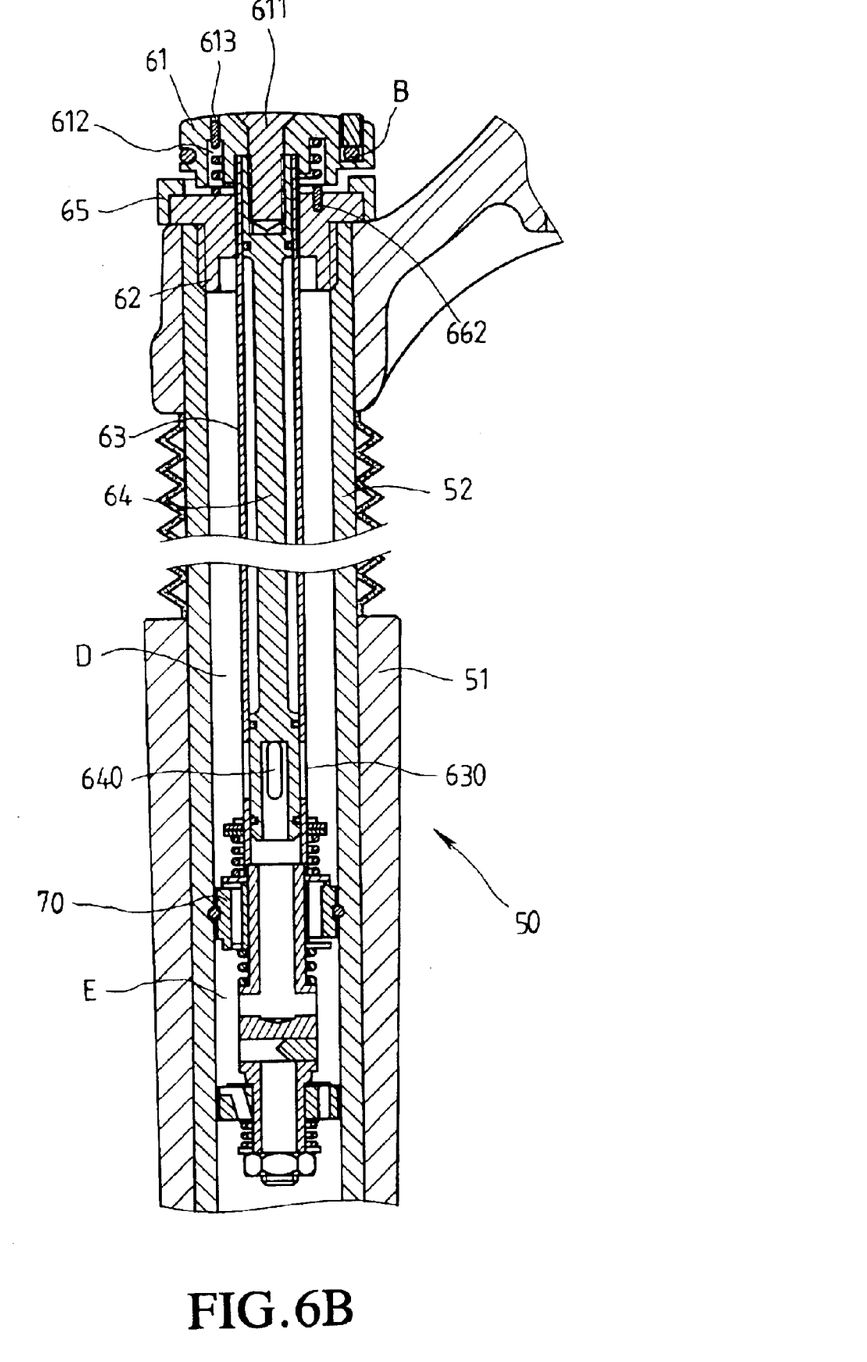
FIG. 6B shows that the cap is rotated and the cylinder is in locked.

Referring to FIGS. 4A and 4B, when the cyclist wants to lock the cylinder 50, he or she simply rotates the lever 22 as indicated by the arrow head. The rotation of the lever 22 pulls the control cable "B" to rotate the cap 61 and the rotation of the cap 61 rotates the rod 64 such that the holes 640 are shifted to the position as shown in FIG. 6B. The holes 640 of the rod 64 are not in alignment with the holes 630 of the tube 63 so that the hydraulic fluid in the two chambers "D" and "E" cannot communicate with each other. Therefore, the cylinder 50 is locked and cannot absorb shocks. When rotating the lever 22, the wings of the engaging member 23 are slid in the grooves 113 and when the lever 22 is positioned in its lockout position as shown in FIG. 4B, the stop device 13 is stuck between the lever 22 and a distal end of the spring plate 231. When rotating the lever 22 in opposite direction and back to its operative position, the cap 61 is rotated by the torsion spring 612 automatically.

The cyclist can easily and conveniently change the setting of the cylinders 50 without changing the pose when riding the bicycle and this feature improves the shortcomings of the conventional ones.

While we have shown and described the embodiment in accordance with the present invention, it should be clear to those skilled in the art that further embodiments may be made without departing from the scope of the present invention.

What is claimed is:

1. A combination of a controller and a bicycle front suspension device, comprising:

a first collar having a through hole which is adapted to be mounted on a bicycle handlebar and a slot defined radially through the first collar, a stop device connected to the first collar and positioned to cross over the slot;

a second collar rotatably engaged in the through hole and a lever extending radially from the second collar, the lever extending through the slot and an engaging member which is located on the second collar and beside the lever, and a control cable having an end fixed to the second collar and extending between an outside of the second collar and an inside of the first collar, the other end of the control cable fixed to a cap of one of two suspension cylinders, the cap being rotated between an operative position for allowing the suspension cylinder to absorb shock, and a lockout position for allowing the suspension cylinder to be locked.

2. The combination as claimed in claim 1, wherein each of two facing insides of the slot having a recess defined therein and a groove is in communication with the respective one of the recesses, the engaging member has two wings which are movably inserted in the recesses and sized to be slid in the grooves, a spring plate extending at angle from the engaging member, the stop device being a pin which extends through two lugs on the first collar, the slot located between the two lugs, the stop device being stuck between the lever and a distal end of the spring plate when the lever is rotated to the lockout position.

3. The combination as claimed in claim 1, wherein a positioning groove is defined in an outer periphery of the second collar and the control cable is engaged with the positioning groove.

4. The combination as claimed in claim 1, wherein each of the cylinders includes an outer tube and an inner tube which is movably inserted in the outer tube, the cap having a rod connected thereto which is inserted in a tube which is located in the inner tube, a separation member connected to the tube and dividing an inner space of the inner tube into a first chamber and a second chamber, the separation member having an open distal end and a central passage, the tube having first holes defined through a wall thereof and the rod having second holes defined radially therethrough, the first chamber being in communication with the second chamber by aligning the second holes with the first holes.

5. The combination as claimed in claim 4, wherein a positioning bolt extends through a center of the cap and is fixed to a base member which is threadedly connected to the inner tube, the cap being rotatable about the positioning bolt.

6. The combination as claimed in claim 5, wherein a torsion spring is connected to the cap so that the cap is rotated when the lever is rotated to the operative position.

* * * * *